(12) United States Patent
Fukuoka et al.

(10) Patent No.: US 11,864,097 B2
(45) Date of Patent: Jan. 2, 2024

(54) COMMUNICATION SYSTEM AND COMMUNICATION METHOD

(71) Applicant: Nippon Telegraph and Telephone Corporation, Tokyo (JP)

(72) Inventors: Aki Fukuoka, Tokyo (JP); Koji Sugisono, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 488 days.

(21) Appl. No.: 17/268,150

(22) PCT Filed: Aug. 9, 2019

(86) PCT No.: PCT/JP2019/031778
§ 371 (c)(1),
(2) Date: Feb. 12, 2021

(87) PCT Pub. No.: WO2020/036161
PCT Pub. Date: Feb. 20, 2020

(65) Prior Publication Data
US 2022/0030510 A1    Jan. 27, 2022

(30) Foreign Application Priority Data

Aug. 14, 2018    (JP) .................................. 2018-152743

(51) Int. Cl.
*H04W 48/18*    (2009.01)
*H04W 24/10*    (2009.01)
(Continued)

(52) U.S. Cl.
CPC ......... *H04W 48/18* (2013.01); *H04L 12/2865* (2013.01); *H04L 12/2872* (2013.01);
(Continued)

(58) Field of Classification Search
CPC . H04W 48/18; H04W 24/10; H04W 28/0236; H04W 28/26; H04W 76/12; H04W 88/16; H04W 88/18; H04L 12/2865; H04L 12/2872; H04L 47/78; H04L 12/2898
See application file for complete search history.

(56) References Cited

U.S. PATENT DOCUMENTS

2018/0234915 A1*   8/2018   Zait ....................... H04W 48/16

OTHER PUBLICATIONS

Arita et al., "Examination of telemetry method corresponding to network slice," IEICE, Technical Report, 2018, 118(6):13-17, 11 pages (with English Translation).

* cited by examiner

Primary Examiner — Omar J Ghowrwal
(74) Attorney, Agent, or Firm — Fish & Richardson P.C.

(57) ABSTRACT

In a communication system, an SLG includes a slice selection unit that selects, in receiving a network slice reservation request including a network condition from a vCPE, based on topology information, a latency state, and processing capability information regarding each of the other SLGs, a destination SLG of a network slice that satisfies the network condition to reserve the network slice, and if there is no destination SLG that satisfies the network condition, newly activates a destination SLG to establish a network slice that satisfies the network condition, and an allocation unit that allocates traffic transmitted from the vCPE to the network slice reserved or established by the selection unit.

6 Claims, 12 Drawing Sheets

(51) Int. Cl.
*H04W 28/02* (2009.01)
*H04W 76/12* (2018.01)
*H04L 12/28* (2006.01)
*H04L 47/78* (2022.01)
*H04W 28/26* (2009.01)
*H04W 88/16* (2009.01)
*H04W 88/18* (2009.01)

(52) U.S. Cl.
CPC .......... *H04L 12/2898* (2013.01); *H04L 47/78* (2013.01); *H04W 24/10* (2013.01); *H04W 28/0236* (2013.01); *H04W 28/26* (2013.01); *H04W 76/12* (2018.02); *H04W 88/16* (2013.01); *H04W 88/18* (2013.01)

| SLG INFORMATION | |
|---|---|
| SLG NUMBER | 1 |
| ENTIRE POSSESSED BANDS | 100G |
| REMAINING BANDS | 30G |
| MEMORY | ○○ |
| CPU | ○ |
| NFV | DPI, AI, OPTIMIZATION, AND TRANSCODING |

Fig. 3

| SLG TOPOLOGY TABLE | | | | | | | |
|---|---|---|---|---|---|---|---|
| NUMBER | LATENCY | BAND | POSSESSED BANDS | REMAINING BANDS | MEMORY | CPU | NFV |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

Fig. 4

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/031778, having an International Filing Date of Aug. 9, 2019, which claims priority to Japanese Application Serial No. 2018-152743, filed on Aug. 14, 2018. The disclosure of the prior application is considered part of the disclosure of this application, and is incorporated in its entirety into this application.

TECHNICAL FIELD

The present invention relates to a communication system and a communication method.

BACKGROUND ART

In recent years, network slices have been proposed to provide network services flexibly and quickly for diverse requirements (including traffic, mobility, capacity, number of users, and latency time). Such a network slice (hereinafter, "slice") is a technique in which a requirement-specific virtual logical network is built from a common network infrastructure to be independently managed (see Non Patent Literature 1, for example).

CITATION LIST

Non Patent Literature

NPL 1: Shinya Arita, Hidetaka Nishihara, Tohru Okugawa, "A Study on Telemetry Scheme Corresponding to Network Slice", IEICE Technical Report, vol. 118, no. 6, NS2018-3, pp. 13-17, April 2018

SUMMARY OF THE INVENTION

Technical Problem

FIG. 12 is a diagram illustrating a slice. In an example of FIG. 12, virtual logical networks including an ultralow-speed-latency slice Na, an IoT/M2M slice Nb, and a large-capacity slice Nc are set to be superimposed on a physical resource.

Here, there is a case where slices among a plurality of infrastructure providers are connected to provide a single logical network (slice). In this case, in order to eliminate a difference in protocol and management policy for each provider, an architecture in which slice gateways (SLGs) are deployed on both ends of the slice is employed. FIG. 13 is a diagram illustrating an example of a slice architecture system.

Such an SLG is assumed to include at least a tunnel termination function, a tunnel allocation function, and a network address translation (NAT) function to operate as a virtual network function (VNF). If the SLG is applied to a management and network orchestration (MANO) model that is a standard of a virtualization management model, the SLG is positioned on a network functions virtualisation infrastructure (NEVI) of which the function is provided by the infrastructure provider, as illustrated in FIG. 13. If the SLG is provided with a latency time measurement function between SLGs, a slice service level agreement (SLA) guarantee can be achieved.

In the slice architecture system, in addition to a network functions virtualization orchestrator (NFVO) that manages a slice by a slice provider, an allocation unit that allocates traffic to an SLG, an SLG management unit that manages an SLG, and an operation support system (OSS)/business support system (BSS) that integrates operations of service providers, an orchestrator is provided to perform integrated control so that a slice is dynamically set and changed. For example, the orchestrator performs control of dynamically changing a priority control value of a slice depending on a situation while causing the SLG to regularly measure a network performance value such as a latency time to secure the SLA guarantee.

In the slice architecture system, slices according to the various types of requirements are preset. For example, allocation of traffic to a preset low-latency slice is employed to achieve a low-latency service.

However, in the slice architecture system known in the art, traffic is only allocated to a preset low-latency network slice, and therefore, the low-latency slice may not be feasible due to unforeseen demand. At this time, if a slice is newly set over a plurality of providers in order to realize the low-latency slice, the orchestrator needs to perform a complicated process of performing a latency allocation in cooperation with a control apparatus of another provider, and thus, it is not possible to set the slice quickly and flexibly.

The present invention has been made in view of the above, and an object thereof is to provide a communication system and a communication method, by which it is possible to flexibly and quickly execute setting and changing a network slice.

Means for Solving the Problem

In order to solve the problems described above and achieve an object, a communication system according to the present invention is a communication system including a network slice being a virtual logical network provided on a physical resource, an SLG provided at an end of the network slice, and a virtualized customer premieres equipment (vCPE) configured to accommodate a terminal. The SLG includes a plurality of the SLGs, and the SLG includes a selection unit configured to select, in receiving a network slice reservation request including a network condition from the vCPE, based on topology information, a latency state, and processing capability information regarding each of the other SLGs, a destination SLG of a network slice satisfying the network condition to reserve the network slice, and if there is no destination SLG satisfying the network condition, configured to newly activate a destination SLG to establish a network slice satisfying the network condition, and an allocation unit configured to allocate traffic transmitted from the vCPE to the network slice reserved or established by the selection unit.

Effects of the Invention

According to the present invention, it is possible to flexibly and quickly execute setting and changing a network slice.

BRIEF DESCRIPTION OF DRAWINGS

FIG. 3 is a table describing SLG information.

FIG. 4 is a table showing an example of a data configuration of an SLG table.

DESCRIPTION OF EMBODIMENTS

One embodiment of the present invention will be described below in detail with reference to the drawings. Note that the present disclosure is not limited by the embodiment. In illustration of the drawings, the same parts are denoted by the same reference signs.

Embodiment

Overview of Communication System

Figure 1:
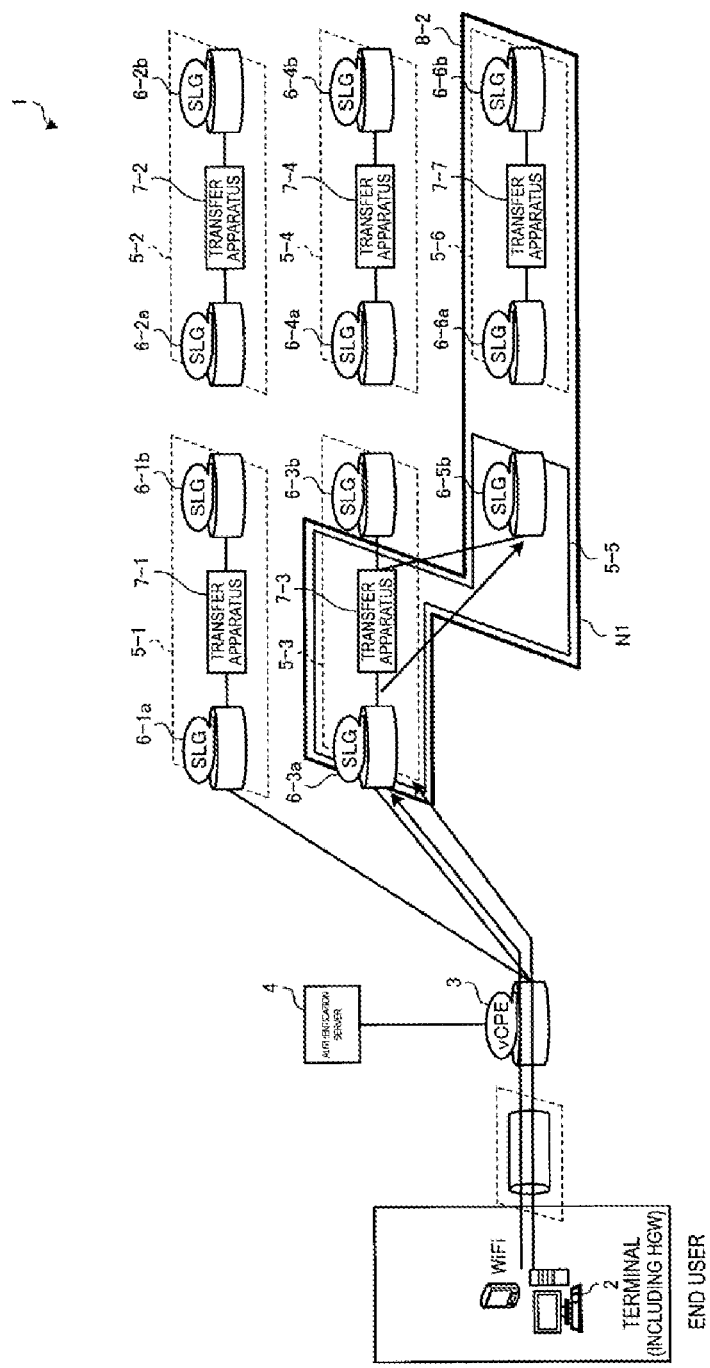
FIG. 1 is a diagram illustrating an example of a configuration of a communication system according to an embodiment.

First, a communication system according to an embodiment will be described with reference to FIG. 1. FIG. 1 is a diagram illustrating an example of a configuration of the communication system according to the embodiment.

A communication system 1 according to the embodiment virtually constructs a logical network slice (hereinafter, "slice") on a common network substrate in accordance with a requirement condition for each service to efficiently realize a high-level requirement condition needed for the service. For example, the communication system 1 establishes slices 5-1 to 5-4 on a physical resource (not illustrated) and realizes communication corresponding to various types of requirements. Both ends of the slices 5-1 to 5-4 are terminated at SLGs 6-1a to 6-1b, and the slices 5-1 to 5-4 include transfer apparatuses 7-1 to 7-4 therein that transfer traffic to the SLGs 6-1a to 6-1b at the both ends. Hereinafter, the slices 5-1 to 5-4 are collectively referred to as "slice 5". The SEGs 6-1a to 6-1b are collectively referred to as "SLG 6". The transfer apparatuses 7-1 to 7-4 are collectively referred to as "transfer apparatus 7".

The communication system 1 includes a terminal 2, an authentication server 4 that performs authentication in response to a connection request from the terminal 2, and a vCPE 3 that transmits a slice reservation request including a network condition to the SLGs 6-1a and 6-3a of the slices 5-1 and 5-3 adjacent to the vCPE 3.

In the communication system 1, the SLG 6 delivers network information and compute information, and holds topology information, a latency state, and processing capability information regarding each of the SLGs 6. Further, in the communication system 1, the SLG 6 reserves a slice or establishes a slice, based on the topology information, the latency state, and the processing capability information regarding each of the SLGs 6.

For example, in receiving a slice reservation request from the vCPE 3, an SLG 6-1 selects a destination SLG (for example, an SLG 6-4b) of a slice that satisfies the network condition to ensure the slices 5-3 and 5-4. Alternatively, in receiving a slice reservation request from the vCPE 3 and if there is no destination SLG that satisfies the network condition, the SLG 6-1 newly activates a destination SLG (6-6b, for example) and establishes slices 5-5 and 5-6 to establish a slice 8-2 that satisfies the network condition.

Thus, in the communication system 1, the SLG 6 autonomously reserves a slice or establishes a slice without intervention of an orchestrator, and thus, it is possible to quickly and flexibly set a slice. Next, a configuration of the SLG 6 will be described.

Configuration of SLG

Figure 2:
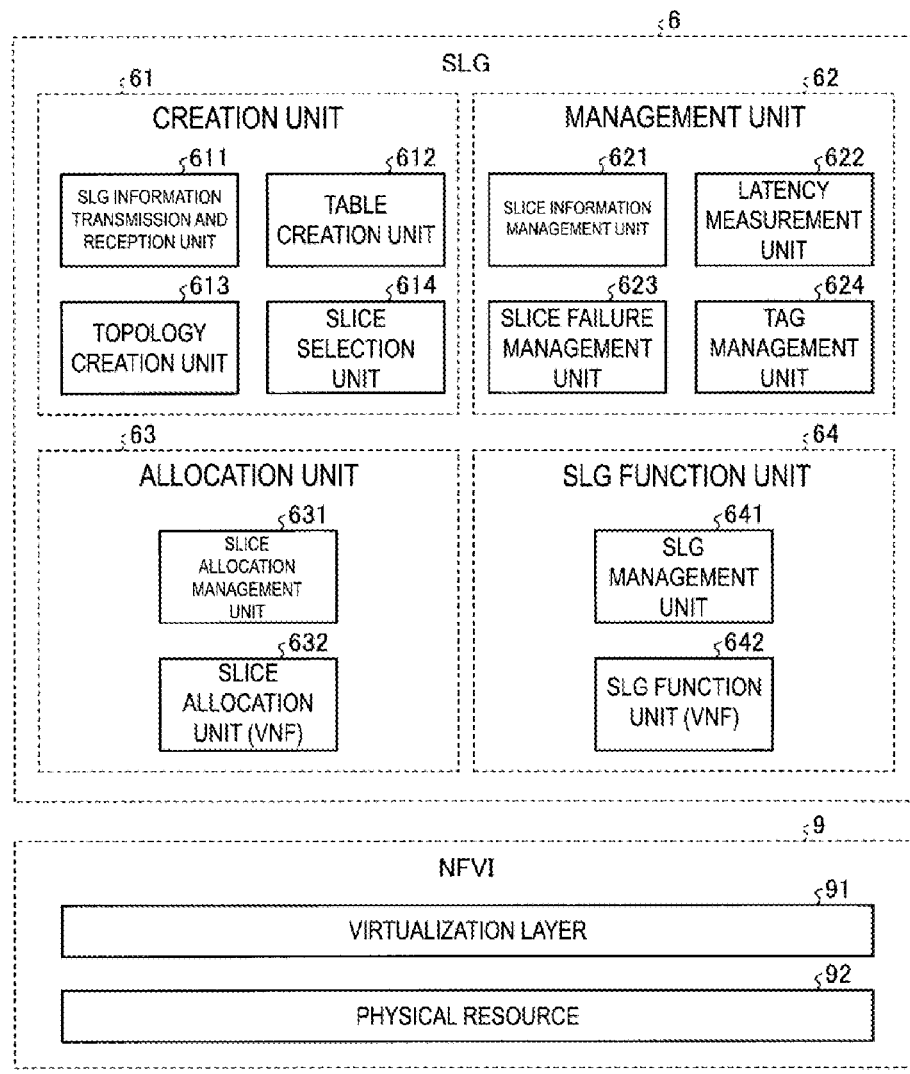
FIG. 2 is a diagram for describing a configuration of an SLG illustrated in FIG. 1.

FIG. 2 is a diagram for describing the configuration of the SLG 6 illustrated in FIG. 1. As illustrated in FIG. 2, the SLG 6 is constructed on a physical resource 92 and a virtualization layer 91 of an NFVI, and includes a creation unit 61, a management unit 62, an allocation unit 63, and an SLG function unit 64 that executes an SLG function.

The creation unit 61 creates topology information, a latency state, and processing capability information regarding each of the other SLGs, and selects a slice for a slice reservation request by the vCPE 3. The creation unit 61 includes an SLG information transmission and reception unit 611, a table creation unit 612 (a first creation unit and an acquisition unit), a topology creation unit 613 (second creation unit), and a slice selection unit 614 (selection unit).

The SLG information transmission and reception unit 611 transmits SLG information being the processing capability information of the SLG 6. If the SLG information transmission and reception unit 611 receives SLG information from each of the other SLGs 6, the SLG information transmission and reception unit 611 adds the SLG information of the SLG 6 including the SLG information transmission and reception unit 611 to the received SLG information of the each of the other SLGs 6 and transmits the added SLG information to an adjacent node.

FIG. 3 is a table describing the SLG information. The SLG information includes an identification number (SLD-ID number) of the SLG 6, entire possessed bands, remaining bands, a memory amount, a central processing unit (CPU), and a processing capability (such as DPI, AI, IoT server control, optimization, and transcoding) of a network functions virtualization (NFV). In other words, the SLG information includes entire possessed bands, used bands, usable resources, and processable functions, along with identification information of each of the SLGs.

The table creation unit 612 creates an SLG table, based on the SLG information of the other SLGs 6 received by the SLG information transmission and reception unit 611. FIG. 4 is a table showing an example of a data configuration of the SLG table. As shown in FIG. 4, the SLG table includes entries for an identification number of the SLG, a latency state, used bands (bands), possessed bands (entire possessed bands), remaining bands, a memory, a CPU, and an NFV. Note that in the table creation unit 612, a latency measurement 622 unit acquires a latency state of each SLG 6, based on a measurement result, and registers the latency state with the SLG table.

The topology creation unit 613 establishes an adjacency relationship with the adjacent SLG, acquires adjacency information of each of the SLGs, and creates a topology map of the SLGs as the topology information. The topology creation unit 613 creates an NFV map possessed by the communication system 1.

In receiving a slice reservation request from the vCPE 3, the slice selection unit 614 selects, based on the topology information, the latency state, and the processing capability information regarding each of the other SLGs 6, a destination SLG of a network slice that satisfies the network condition to reserve the network slice. Alternatively, if there is no destination SLG that satisfies the network condition, the slice selection unit 614 newly activates a destination SLG to establish a slice that satisfies the network condition. The slice selection unit 614 selects the destination SLG, based on the SLG table, the topology map, and the NFV map.

If there is neither a slice nor a destination SLG that satisfies the network condition, the slice selection unit 614 searches, based on the SLG table, the topology map, and the NFV map, for a computer node from subordinate SLGs 6 satisfying a latency requirement of the network condition, and causes the searched computer node to newly activate a destination SLG. The slice selection unit 614 transmits a resource reservation request to the destination SLG.

Upon receiving a network slice reservation request including SLA information of the terminal 2 and a required NFV from the vCPE 3, the slice selection unit 614 selects, based on the SLG table, the topology map, and the NFV map, a destination SLG including the corresponding NFV. The slice selection unit 614 transmits a request for reserving resources up to the selected destination SLG and a request for reserving the corresponding NFV, to the destination SLG, and reserves the network slice.

The management unit 62 manages information regarding a slice. The management unit 62 includes a slice information management unit 621 that manages at least identification information and access information of each slice, a latency measurement unit 622 that measures a latency by transmitting a packet for each destination SLG according to the topology map, a slice failure management unit 623 that manages the presence or absence of a slice failure, and a tag management unit 624 that manages a tag imparted to the SLG 6. A management result or a latency measurement result managed by the management unit 62 is output to the creation unit 61.

The allocation unit 63 allocates traffic transmitted from the vCPE 3 to the network slice reserved or established by the slice selection unit 614. The allocation unit 63 includes a slice allocation management unit 631 that manages allocation of traffic to a slice and a slice allocation unit 632 that executes allocation of traffic to a slice. The slice allocation unit 632 operates as the VNF.

The SLG function unit 64 includes an SLG management unit 641 and an SLG function unit (VNF) 642. The SLG management unit 641 manages SLG processing by the SLG function unit (VNF) 642. The SLG function unit (VNF) 642 includes a tunnel termination function, a tunnel allocation function, and an NAT function, and operates as the VNF.

Processing Flow

Figure 5:
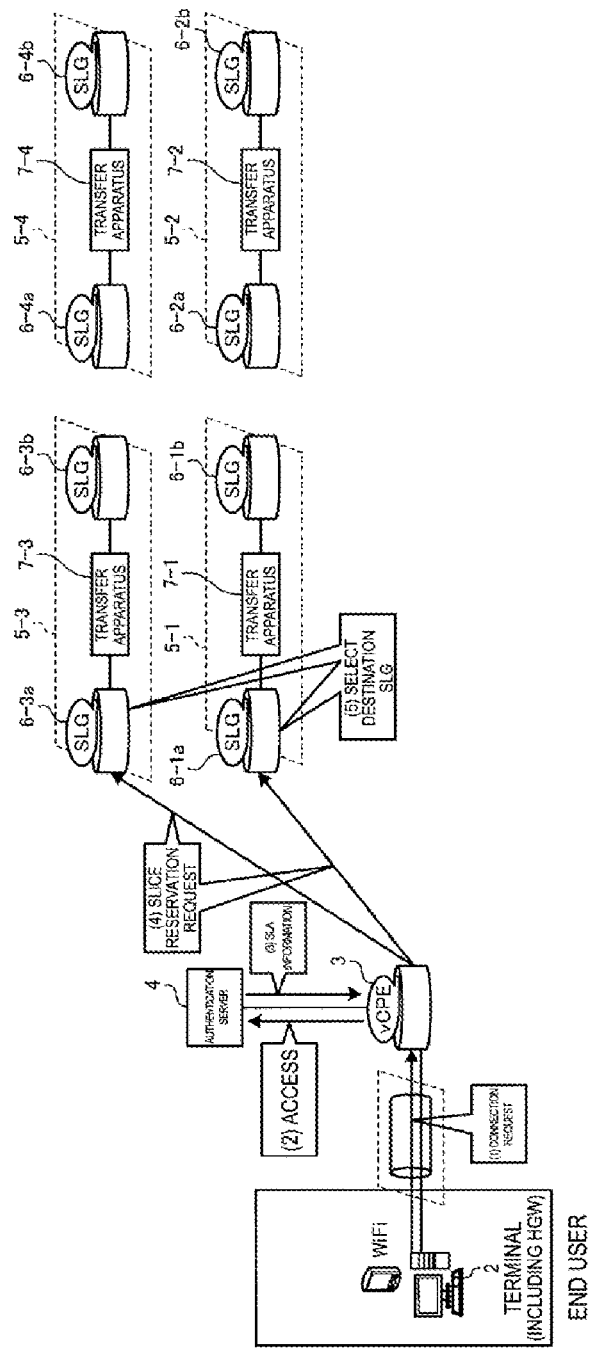
FIG. 5 is a diagram describing a processing flow up to a slice establishment in the communication system illustrated in FIG. 1.
Figure 6:
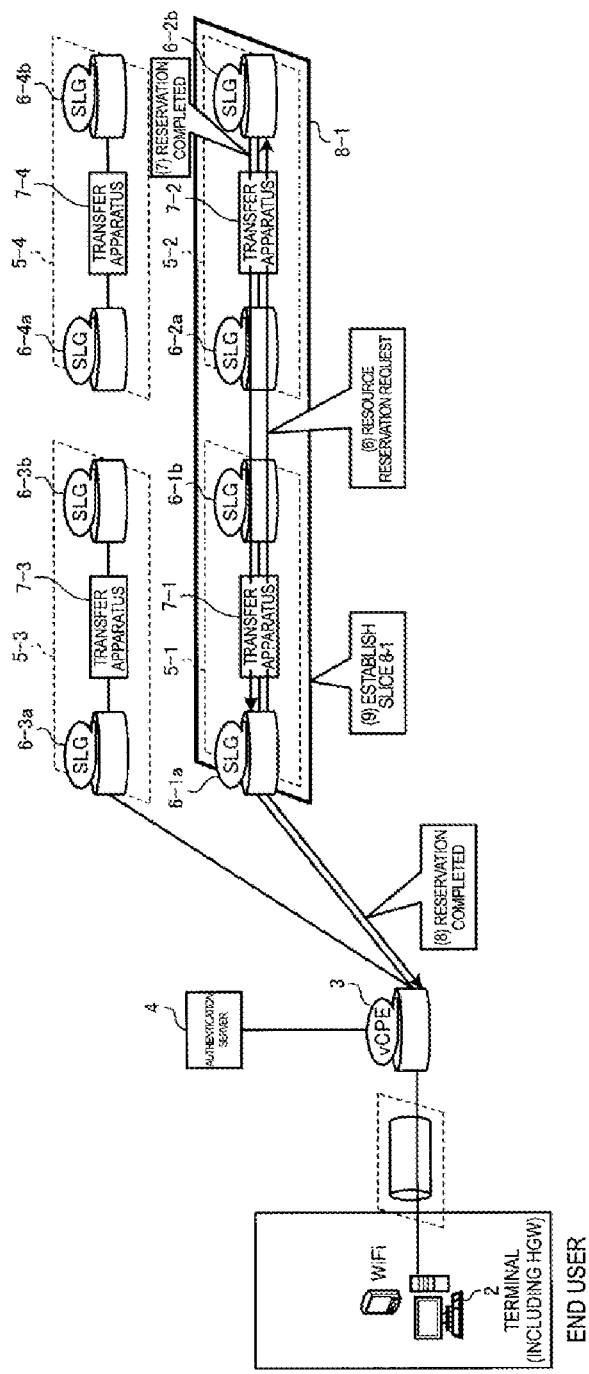
FIG. 6 is a diagram describing the processing flow up to the slice establishment in the communication system illustrated in FIG. 1.

A processing flow up to a slice establishment in the communication system 1 will be described next. First, a case in which there is a slice that satisfies a latency condition will be described with reference to FIGS. 5 and 6. FIGS. 5 and 6 are diagrams each describing a processing flow up to a slice establishment in the communication system 1 illustrated in FIG. 1.

As illustrated in FIG. 5, firstly, a connection request is transmitted from the terminal 2 to the vCPE 3 on the network side (see (1) in FIG. 5). The vCPE 3 receiving the connection request accesses the authentication server 4 (see (2) in FIG. 5), The authentication server 4 transmits, as the network condition, user SLA information of the terminal 2 from which the connection request is transmitted, to the vCPE 3 (see (3) in FIG. 5). In other words, the authentication server 4 transmits the network condition such as a band and a latency required by the terminal 2 from which the connection request is transmitted. The vCPE 3 receiving the SLA information transmits, to the SLGs 6-1*a* and 6-3*a* adjacent thereto, a traffic destination corresponding to the terminal 2 and the SLA information, and requests a slice reservation (see (4) in FIG. 5).

The SLGs 6-1*a* and 6-3*a* requested from the vCPE 3 to reserve a slice refer to the SLG tables possessed by the SLGs 6-1*a* and 6-3*a* to select a destination SLG corresponding to the traffic destination (see (5) in FIG. 5). At that time, the SLGs 6-1*a* and 6-3*a* check whether a latency SLA is within an estimated range.

Here, an example is described in which the SLG 6-1*a* selects the destination SLG 6-2*b* having the latency SLA within an estimated range and corresponding to the traffic destination. In this case, the SLG 6-1*a* transmits a request for reserving resources up to the selected destination SLG 6-2*b* (see (6) in FIG. 6). The destination SLG 6-2*b* reserves a slice and transmits a reservation complete message (see (7) in FIG. 6). Relay SLGs (in the example of FIG. 6, the SLGs 6-1*b* and 6-2*a*) receiving the message from the destination SLG 6-2*b* add self-node information and transmit the resultant message to the source SLG 6-1*a* from which the resource reservation request is transmitted.

In response thereto, the SLG 6-1*a* sends a reservation completion to the vCPE 3 (see (8) in FIG. 6), and establishes a slice 8-1 including the slices 5-1 and 5-2 (see (9) in FIG. 6). The vCPE 3 then transmits traffic to the SLG 6-1*a*, and the SLG 6-1*a* transmits the traffic to the destination SLG 6-2*b* via the slice 8-1.

Figure 7:
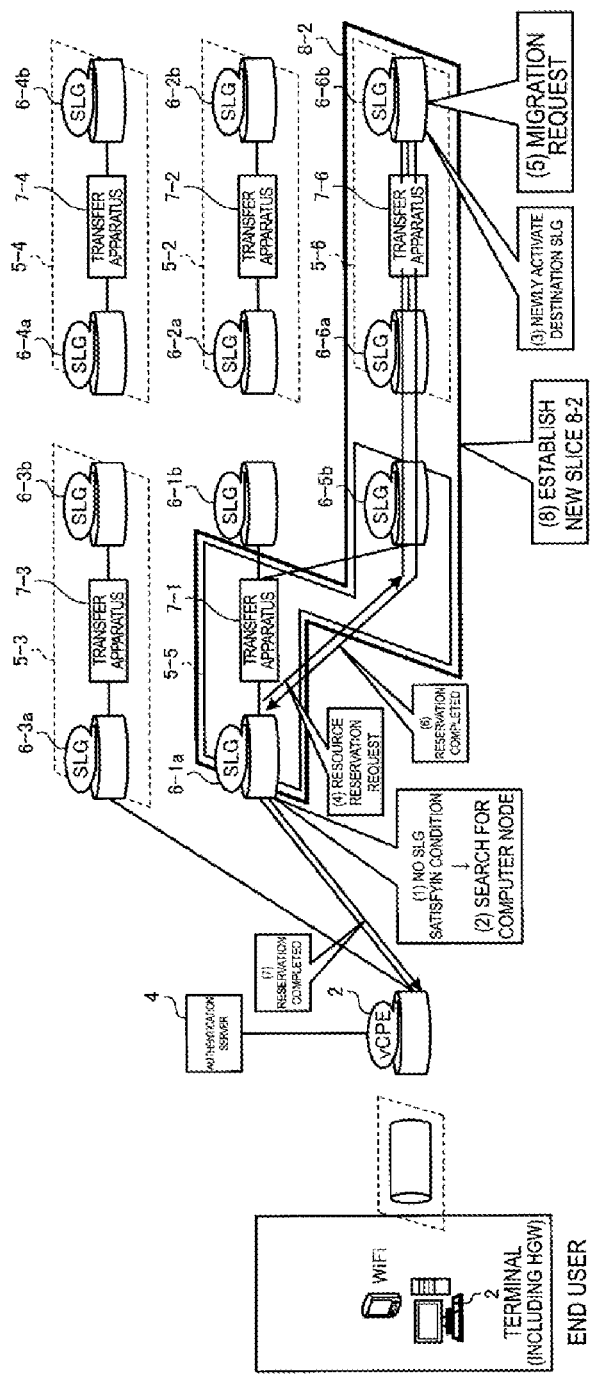
FIG. 7 is a diagram illustrating another example of the processing flow up to the slice establishment in the communication system illustrated in FIG. 1.

Next, a case where there is no slice that satisfies the latency condition will be described with reference to FIG. 7. FIG. 7 is a diagram illustrating another example of the processing flow up to the slice establishment in the communication system 1 illustrated in FIG. 1.

In FIG. 7, description is given of processing after reserving the slice by the vCPE 3 for the SLGs 6-1*a* and 6-3*a*. The SLGs 6-1*a* and 6-3*a* requested from the vCPE 3 to reserve a slice refer to the SLG tables possessed by the SLGs 6-1*a* and 6-3*a* to select a destination SLG corresponding to the traffic destination and having the latency SLA within an estimated range.

Here, a case Where there is no SLG that satisfies the network condition is described (see (1) in FIG. 7). In this case, the SLG 6-1*a* searches for a compute node from subordinate SLGs that satisfy the latency requirement (see (2) in FIG. 7). The SLG 6-1*a* then newly activates the destination SLG 6-6*b* in the searched compute node (see (3) in FIG. 7) and transmits the resource reservation request (see (4) in FIG. 7). The destination SLG 6-6*b* transmits a migration request for compute information of the NFV (see (5) in FIG. 7). If the migration is complete, the destination SLG 6-6*b* transmits a reservation complete message (see (6) in FIG. 7). Relay SLGs (in the example of FIG. 7, the SLGs 6-5b and 6-6a) receiving the message add self-node information and transmit the resultant message to the SLG 6-1a, from which the resource reservation request is transmitted.

In response thereto, the SLG 6-1a sends a reservation completion to the vCPE 3 (see (7) in FIG. 7), and establishes a slice 8-2 including the slices 5-5 and 5-6 (see (8) in FIG. 7). The vCPE 3 then transmits traffic to the SLG 6-1a, and the SLG 6-1a transmits the traffic to the destination SLG 6-2b via the slice 8-2.

Figure 8:
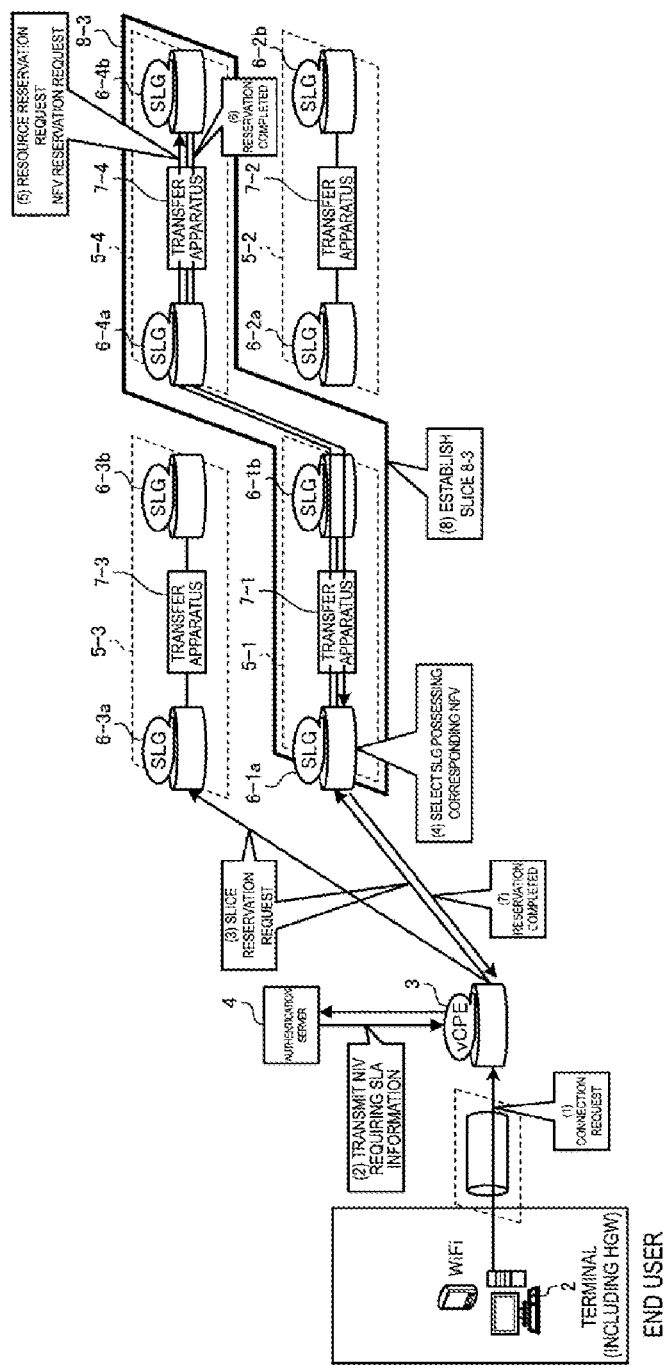
FIG. 8 is a diagram illustrating another example of the processing flow up to the slice establishment in the communication system illustrated in FIG. 1.

Next, a case where an NFV establishment is required to satisfy the latency condition will be described with reference to FIG. 8. FIG. 8 is a diagram illustrating another example of the processing flow up to the slice establishment in the communication system 1 illustrated in FIG. 1.

As illustrated in FIG. 8, firstly, a connection request is transmitted from the terminal 2 to the vCPE 3 on the network side (see (1) in FIG. 8). The vCPE 3 receiving the connection request accesses the authentication server 4. The authentication server 4 transmits, as the network condition, user SLA information of the terminal 2 from which the connection request is transmitted, and a required NFV, to the vCPE 3 (see (2) in FIG. 8). The vCPE 3 receiving the SLA information transmits, to the adjacent SLGs 6-1a and 6-3a, a traffic destination corresponding to the terminal 2, the SLA information, and the required NFV, and requests a slice reservation (see (3) in FIG. 8).

The SLGs 6-1a and 6-3a requested from the vCPE 3 to reserve a slice refer to the SLG tables possessed by the SLGs 6-1a and 6-3a to select an SLG having the latency SLA within an estimated range, corresponding to the traffic destination, and possessing the required NFV (see (4) in FIG. 8).

A case in which the SLG 6-1a selects the SLG 6-4b as the destination SLG will be described as an example. In this case, the SLG 6-1a transmits a resource reservation request up to the selected destination SLG 6-4b and a required NFV reservation request (see (5) in FIG. 8). If the destination SLG 6-4b reserves a slice and reserves the required NFV, the destination SLG 6-4b transmits a reservation complete message (see (6) in FIG. 8). Relay SLGs (in the example of FIG. 8, the SLGs 6-1b and 6-4a) receiving the message from the destination SLG 6-4b add self-node information and transmit the resultant message to the source SLG 6-1a from which the requests are transmitted.

In response thereto, the SLG 6-1a sends a reservation completion to the vCPE 3 (see (7) in FIG. 8), and establishes a slice 8-3 including the slices 5-1 and 5-4 (see (8) in FIG. 8). The vCPE 3 then transmits traffic to the SLG 6-1a, and the SLG 6-1a transmits the traffic to the destination SLG 6-2b via the slice 8-3.

SLG Table Creation Processing

Figure 9:
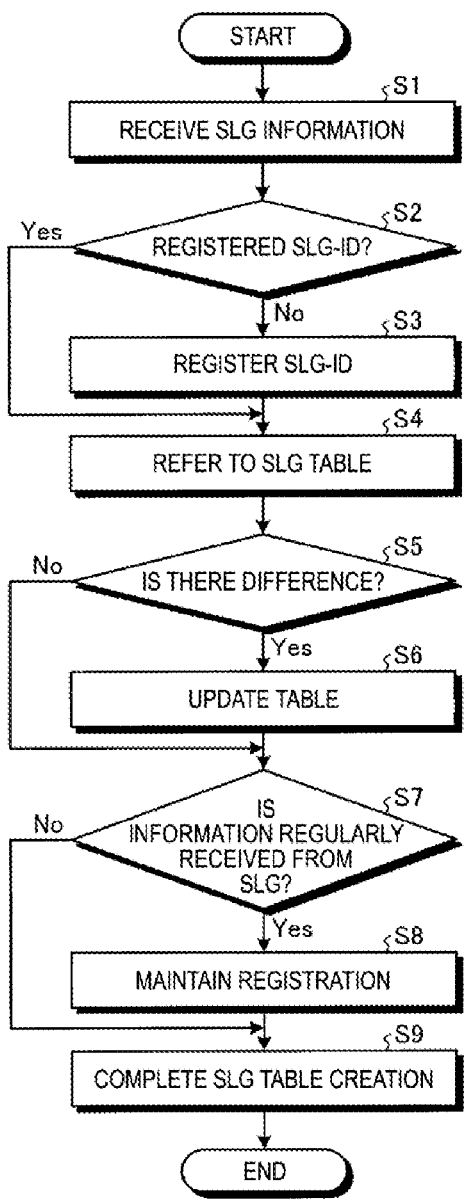
FIG. 9 is a flowchart illustrating a processing procedure of processing of creating the SLG table by the SLG illustrated in FIG. 1.

Next, a processing procedure for the SLG 6 to complete the creation of the SLG table will be described, FIG. 9 is a flowchart illustrating a processing procedure of processing of creating the SLG table by the SLG 6 illustrated in FIG. 1.

As illustrated in FIG. 9, in receiving SLG information from another SLG 6 (step S1), the SLG 6 determines whether an SLG-ID number in the received SLG information is an ID number already registered with the SLG table (step 2). If the SLG 6 determines that the SLG-ID number in the received SLG information is not an ID number already registered with the SLG table (step S2: No), the SLG 6 registers the SLG-ID number with the SLG table (step 3).

If the SLG 6 determines that the SLG-ID number in the received SLG information is an ID number already registered with the SLG table (step S2: Yes), or after an end of step S3, the SLG 6 refers to the SLG table (step S4) to determine whether there is a difference between the information corresponding to the SLG-ID number and the information included in the received SLD information (step S5).

If the SLG 6 determines that there is a difference between the information corresponding to the SLG-TD number and the information included in the received SLD information (step S5: Yes), the SLG 6 updates the SLD table according to the difference (step S6).

If the SLG 6 determines that there is no difference between the information corresponding to the SLG-ID number and the information included in the received SLD information (step S5: No), or after an end of step S6, the SLG 6 determines whether information is regularly received from the SLG 6 from which the SLD information is transmitted (step S7).

If the SLG 6 determines that the information is regularly received from the SLG 6 from which the SLD information is transmitted (step S7: Yes), the SLG 6 maintains registration of the information corresponding to the SLD-ID number (step S8).

If the SLG 6 determines that the information is not regularly received from the SLG 6 from which the SLD information is transmitted (step S7: No), or after an end of step S8, the SLG 6 completes the creation of the SLG table (step S9) and the processing ends.

Traffic Transmission Processing

Figure 10:
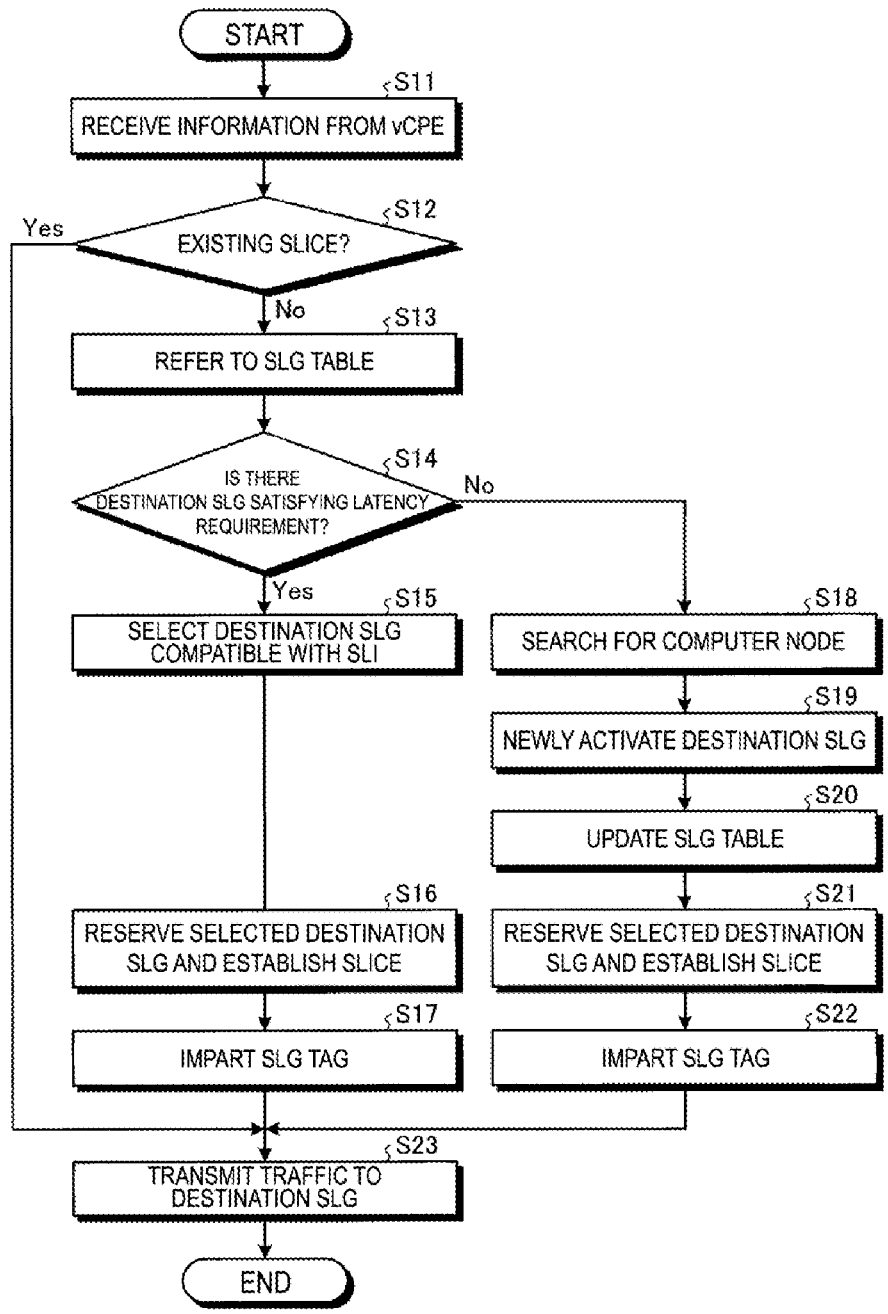
FIG. 10 is a flowchart illustrating a processing procedure of processing of transmitting traffic to a slice by the SLG illustrated in FIG. 1.

Next, a processing procedure for processing of transmitting traffic to a slice by the SLG 6 will be described. FIG. 10 is a flowchart illustrating a processing procedure of processing of transmitting traffic to a slice by the SLG 6 illustrated in FIG. 1.

As illustrated in FIG. 10, in receiving information including a slice reservation request and a network condition from the vCPE 3 (step S11), the SLG 6 determines, based on information managed by the management unit 62, whether an existing slice is registered as a transmission target of the traffic (step S12).

If the SLG 6 determines that there is no existing slice registered as the transmission target of the traffic (step S12: No), the SLG 6 refers to the SLG table (step S13) to determine whether there is a destination SLG that satisfies the latency requirement (step S14). Note that if a required NFV is included in the network condition, the SLG 6 selects an SLG which is a destination SLG that satisfies the latency requirement and possesses the required NFV.

If the SLG 6 determines that there is a destination SLG that satisfies the latency requirement (step S14: Yes), or if the SLG 6 determines that there is an SLG 6 which is a destination SLG that satisfies the latency requirement and possesses the required. NFV, the SLG 6 selects a destination SLG compatible with Scalable Line Interconnect (SU) (step S15). The SLG 6 transmits a request for reserving resources up to the selected destination SLG, or a request for reserving resources up to the selected destination SLG and a required NFV reservation request. The destination SLG reserves a slice and transmits a reservation complete message to the SLG 6 from which the request is transmitted.

As a result, the SLG 6 reserves the selected destination SLG, establishes the slice (step S16), and imparts a tag corresponding to the slice to the SLG 6 of the established slice (step S17).

If the SLG 6 determines that there is no destination SLG that satisfies the latency requirement (step S14: No), the SLG 6 searches for a compute node from subordinate SLGs that satisfy the latency requirement (step S18). The SLG 6 newly activates a destination SLG in the searched compute node (step S19), and transmits the resource reservation request. Note that the newly activated destination SLG transmits a migration request for compute information of the NFV, and if the migration is complete, the destination SLG transmits a reservation complete message. In response thereto, the SLG 6 updates the SLG table (step S20) and adds information on the new destination SLG. As a result, the SLG 6 reserves the destination SLG, establishes the slice (step S21), and imparts a tag corresponding to the slice to the SLG 6 of the established slice (step S22).

If the SLG 6 determines that the existing slice is registered (step S12: Yes), after an end of step S17, or after an end of step S22, the SLG 6 transmits traffic to the destination SLG via the existing slice or the established slice (step S23).

Effects of Embodiment

In the communication system 1 according to the present embodiment, in receiving a network slice reservation request including a network condition from the vCPE 3, the SLG 6 selects a destination SLG of a slice that satisfies the network condition to reserve the network slice, based on topology information, a latency state, and processing capability information regarding each of the other SLGs. Alternatively, if there is no destination SLG that satisfies the network condition, the SLG 6 newly activates a destination SLG to establish a network slice that satisfies the network condition. The SLG 6 allocates traffic transmitted from the vCPE to the reserved or established slice.

Thus, in the communication system 1, the SLG 6 autonomously reserves a slice or establishes a slice without intervention of an orchestrator, and thus, it is possible to exhibit an effect to quickly and flexibly set the slice.

System Configuration and the Like

The components of each device illustrated in the drawing are functional and conceptual components and are not necessarily physically configured as illustrated in the drawing. That is, specific configurations of dispersion and integration of the devices are not limited to those illustrated in the drawing, and all or some of them can be configured to be functionally or physically dispersed and integrated in any granularity in accordance with various loads, usage conditions, and the like. Further, all or some of processing functions performed by the devices may be realized by a CPU and a program analyzed and executed by the CPU, or may be realized as hardware by wired logic.

Further, all or some of the processes described as being automatically performed, among the processes described in the present embodiment, can also be manually performed, or all or some of the processes described as being manually performed can also be automatically performed by a known method. For example, the various processing described in the present embodiment may be executed not only in chronological order as described, but also in parallel or individually according to the needs or the processing capability of the apparatus executing the processing. In addition, information including the processing procedures, the control procedures, the specific names, and various data and parameters described in the above-described document and drawings can be arbitrarily changed except for the case of special description.

Program

Figure 11:
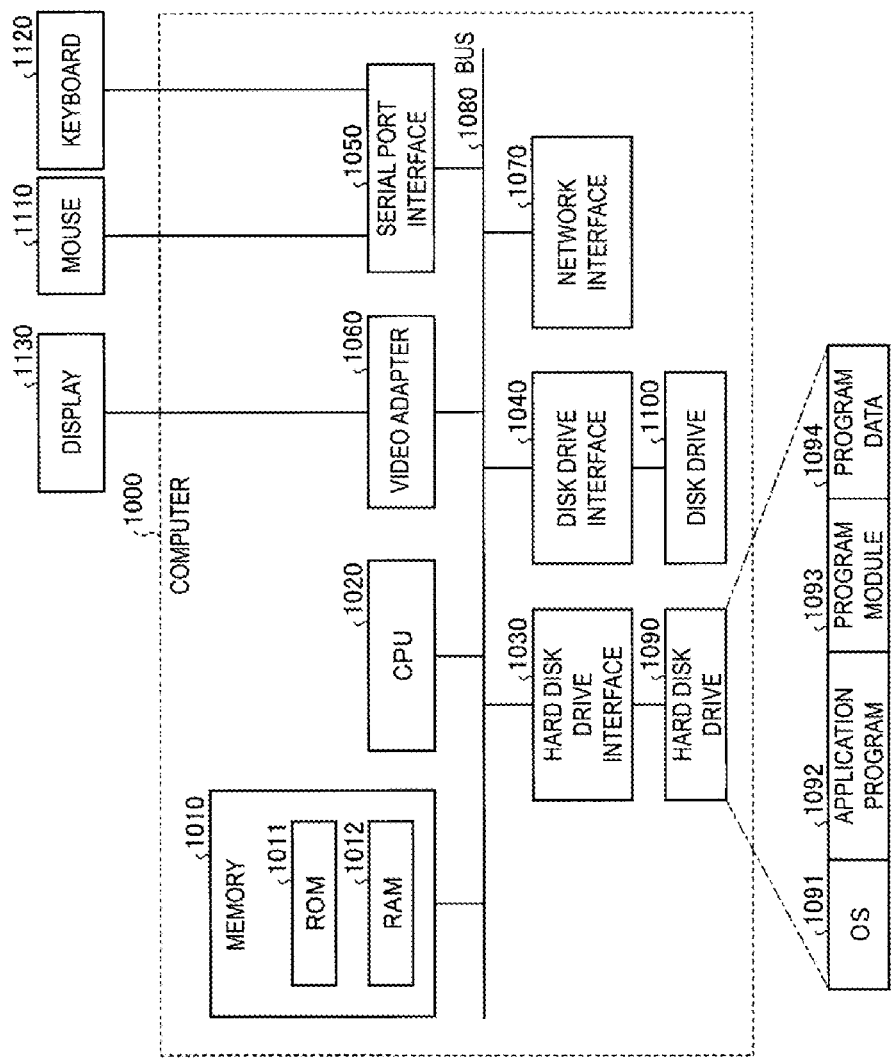
FIG. 11 is a diagram illustrating an example of a computer that realizes a service path management apparatus by executing a program.
Figure 12:
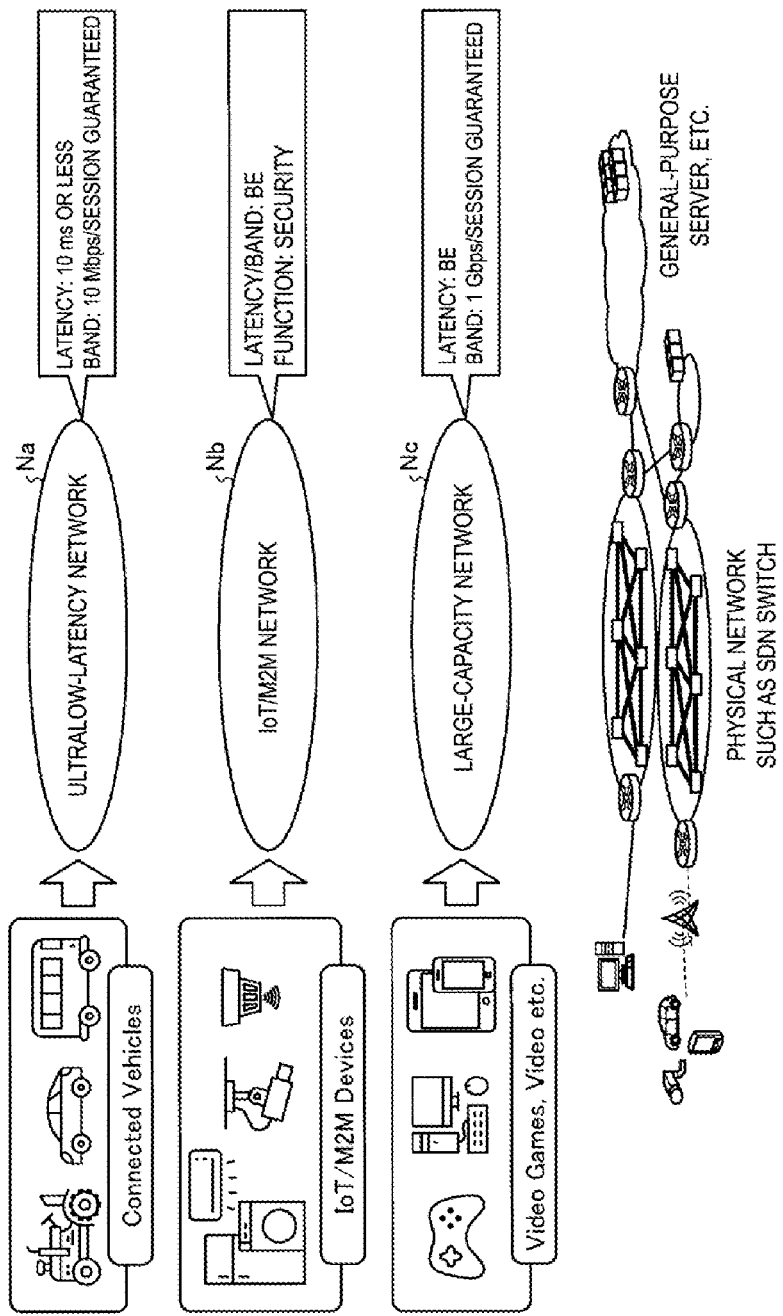
FIG. 12 is a diagram illustrating a slice.
Figure 13:
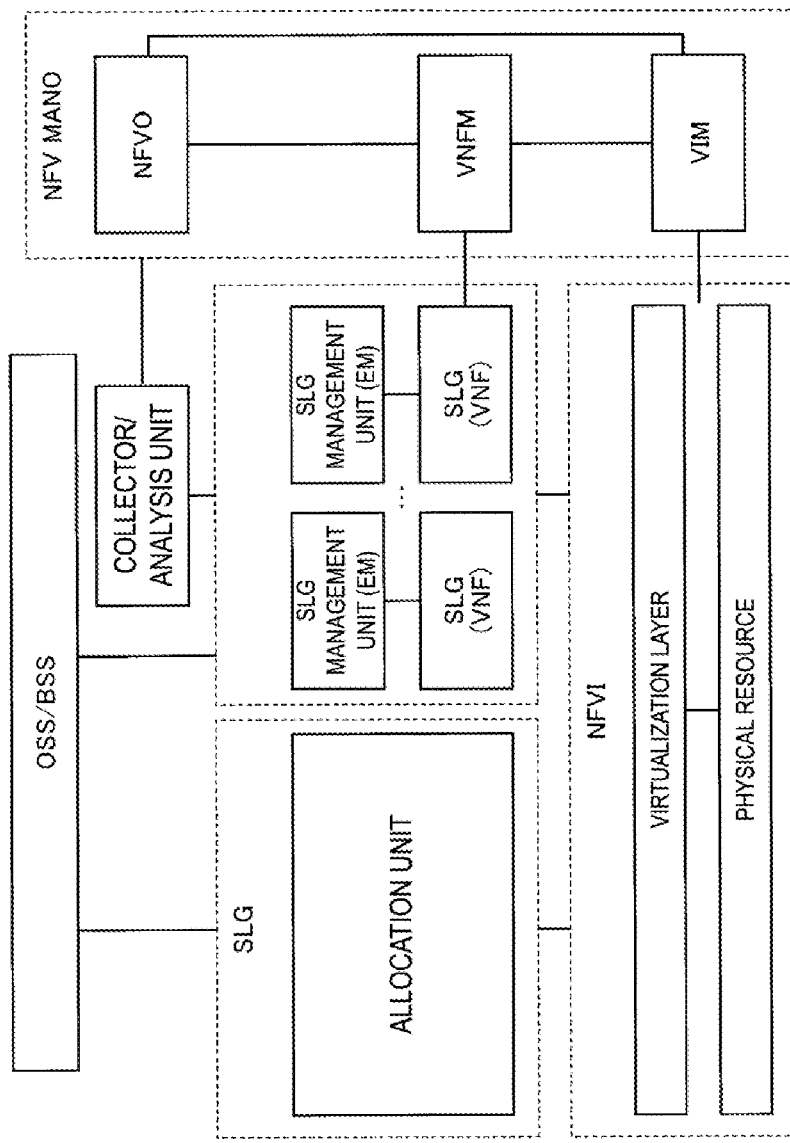
FIG. 13 is a diagram illustrating an example of a slice architecture system.

FIG. 11 is a diagram illustrating an example of a computer that realizes a physical resource constructing the SLG 6 and the vCPE 3 by executing a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a Random Access Memory (RAM) 1012. The ROM 1011 stores a boot program, such as Basic Input Output System (BIOS), for example. The hard disk drive interface 1030 is connected to the hard disk drive 1031. The disk drive interface 1040 is connected to a disk drive 1041. A detachable storage medium such as a magnetic disk or an optical disc is inserted into the disk drive 1041. The serial port interface 1050 is connected to, for example, a mouse 1110 and a keyboard 1120. A video adapter 1060 is connected to, for example, a display 1130.

Here, the hard disk drive 1031 stores, for example, an OS 1091, an application program 1092, a program module 1093, and program data 1094. That is, the program defining each processing of the physical resource constructing the SLG 6 and the vCPE 3 is implemented as the program module 1093 in which codes executable by the computer 1000 are described. The program module 1093 is stored in, for example, the hard disk drive 1031. For example, the program module 1093 for executing processing similar to the functional configuration in the physical resource constructing the SLG 6 and the vCPE 3 is stored in hard disk drive 1031. Note that the hard disk drive 1031 may be replaced with a solid state drive (SSD).

In addition, setting data used in the processing of the above-described embodiment is stored in, for example, the memory 1010 or the hard disk drive 1031, as the program data 1094. In addition, the CPU 1020 reads the program module 1093 and the program data 1094 stored in the memory 1010 and the hard disk drive 1031 to the RAM 1012 and executes them as necessary.

Note that the program module 1093 and the program data 1094 are not limited to being stored in the hard disk drive 1031, and may be stored, for example, in a removable storage medium, and read by the CPU 1020 via a disk drive 1041 or its equivalent. Alternatively, the program module 1093 and the program data 1094 may be stored in other computers connected via a network (a Local Area Network (LAN), and a Wide Area Network (WAN)). In addition, the program module 1093 and the program data 1094 may be read by the CPU 1020 from another computer through the network interface 1070.

Although the embodiment to which the invention made by the present inventors is applied have been described above, the invention is not limited by the description and the drawings as a part of the disclosure of the present invention based on the embodiment. In other words, all of other embodiments, examples, operation technologies, and the like made by those skilled in the art on the basis of the embodiment are within the scope of the invention.

REFERENCE SIGNS LIST

1 Communication system
2 Terminal
3 vCPE
4 Authentication server
6, 6-1a to 6-6b SLG
7, 7-1 to 7-7 Transfer apparatus
9 NFVI
61 Creating unit
62 Management unit
63 Allocation unit
64 SLG function unit 91 Virtualization layer
92 Physical resource
611 SLG information transmission and reception unit
612 Table creation unit
613 Topology creation unit
614 Slice selection unit
621 Slice information management unit
622 Latency measurement unit
623 Slice failure management unit
624 Tag management unit
631 Slice allocation management unit
632 Slice allocation unit (VNF)
641 SLG management unit
642 SLG function unit (VNF)

The invention claimed is:

1. A communication system, comprising: a network slice being a virtual logical network provided on a physical resource; a slice gateway (SLG) provided at an end of the network slice; and a virtualized customer premieres equipment (vCPE) configured to accommodate a terminal,
wherein the SLG includes a plurality of the SLGs, and the SLG includes:
a selection unit, including one or more processors, configured to select, in receiving a network slice reservation request including a network condition from the vCPE, based on topology information, a latency state, and processing capability information regarding each of the other SLGs, a destination SLG of the network slice satisfying the network condition to reserve the network slice, and if there is no destination SLG satisfying the network condition, configured to newly activate a destination SLG to establish the network slice satisfying the network condition, wherein the selection unit is configured to, in receiving the network slice reservation request including service level agreement (SLA) information of the terminal and a required network functions virtualization (NFV) from the vCPE, select, based on the topology information, the latency state, and the processing capability information regarding each of the other SLGs, the destination SLG including a corresponding NFV and transmit a request for reserving resources up to the selected destination SLG and a request for reserving the corresponding NFV to the destination SLG to establish the network slice; and
an allocation unit, including one or more processors, configured to allocate traffic transmitted from the vCPE to the network slice reserved or established by the selection unit.

2. The communication system according to claim 1, wherein if there is neither the network slice nor a destination SLG satisfying the network condition, the selection unit is configured to search for a computer node from subordinate SLGs satisfying a latency requirement of the network condition, based on the topology information, the latency state, and the processing capability information regarding the each of the other SLGs, cause the searched computer node to newly activate a destination SLG, and transmit a resource reservation request to the newly activated destination SLG.

3. The communication system according to claim 1, wherein the SLG includes:
a first creation unit, including one or more processors, configured to receive, from each of the other SLGs, the processing capability information regarding each of the other SLGs including entire possessed bands, used bands, usable resources, and processable functions along with identification information of the each of the other SLGs to create an SLG table indicating the processing capability information regarding each of the other SLGs;
a second creation unit, including one or more processors, configured to establish an adjacency relationship with an adjacent SLG, and acquire adjacency information of the plurality of SLGs to create a topology map of the plurality of SLGs as the topology information; and
an acquisition unit, including one or more processors, configured to transmit, according to the topology information, a packet to a destination SLG of a plurality of the destination SLGs to measure a latency, and acquire a latency state of every destination SLG.

4. A communication method executed by a communication system including a network slice being a virtual logical network provided on a physical resource, an SLG provided at an end of the network slice, the SLG including a plurality of the SLGs, and a vCPE configured to accommodate a terminal, the communication method comprising:
receiving, by the SLG, a network slice reservation request including a network condition from the vCPE;
selecting, by the SLG, a destination SLG of the network slice satisfying the network condition, based on topology information, a latency state, and processing capability information regarding each of the other SLGs to reserve the network slice, wherein selecting the destination SLG comprises:
receiving the network slice reservation request including service level agreement (SLA) information of the terminal and a required network functions virtualization (NFV) from the vCPE,
selecting, by the SLG, based on the topology information, the latency state, and the processing capability information regarding each of the other SLGs, the destination SLG including a corresponding NFV, and
transmitting, by the SLG, a request for reserving resources up to the selected destination SLG and a request for reserving the corresponding NFV to the destination SLG to establish a network slice;
newly activating, by the SLG, a destination SLG to establish the network slice satisfying the network condition, if there is neither a network slice nor a destination SLG satisfying the network condition; and
allocating, by the SLG, traffic transmitted from the vCPE to the reserved or established network slice.

5. The communication method according to claim 4, further comprising:
if there is neither the network slice nor a destination SLG satisfying the network condition,
searching, by the SLG, for a computer node from subordinate SLGs satisfying a latency requirement of the network condition, based on the topology information, the latency state, and the processing capability information regarding the each of the other SLGs,
causing, by the SLG, the searched computer node to newly activate a destination SLG, and
transmitting, by the SLG, a resource reservation request to the newly activated destination SLG.

6. The communication method according to claim 4, further comprising:
receiving, by the SLG, from each of the other SLGs, the processing capability information regarding each of the other SLGs including entire possessed bands, used bands, usable resources, and processable functions along with identification information of the each of the other SLGs to create an SLG table indicating the processing capability information regarding each of the other SLGs;

establishing, by the SLG, an adjacency relationship with an adjacent SLG, and acquiring adjacency information of the plurality of SLGs to create a topology map of the plurality of SLGs as the topology information; and transmitting, by the SLG according to the topology information, a packet to a destination SLG of a plurality of the destination SLGs to measure a latency, and acquiring a latency state of every destination SLG.

* * * * *